US008925074B1

(12) United States Patent
Ho (10) Patent No.: US 8,925,074 B1
(45) Date of Patent: Dec. 30, 2014

(54) METHODS AND APPARATUS FOR DETECTING ABNORMAL COMPUTER FILES

(75) Inventor: Chik-Kun Ho, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 9 days.

(21) Appl. No.: 13/550,869

(22) Filed: Jul. 17, 2012

Related U.S. Application Data (60) Provisional application No. 61/650,094, filed on May 22, 2012.

(51) Int. Cl.
*G06F 11/00* (2006.01)
(52) U.S. Cl.
USPC ............. 726/22; 711/201; 711/203; 711/209; 711/217; 711/151; 380/2
(58) Field of Classification Search
CPC ............ H04L 63/1416; H04L 63/1408; H04L 63/145; H04L 63/1441; H04L 63/1458; G06F 12/109; G06F 21/56
USPC .......................... 711/201, 203, 209, 217, 151
See application file for complete search history.

(56) References Cited

U.S. PATENT DOCUMENTS

| | | | |
|---|---|---|---|
| 2007/0168708 A1* | 7/2007 | McCuller | 714/6 |
| 2008/0127038 A1* | 5/2008 | Park et al. | 717/100 |
| 2008/0170684 A1* | 7/2008 | Widjaja et al. | 380/2 |
| 2008/0209562 A1* | 8/2008 | Szor | 726/24 |
| 2009/0077003 A1* | 3/2009 | Rai et al. | 707/1 |
| 2010/0177205 A1* | 7/2010 | Shimoda et al. | 348/222.1 |
| 2010/0223499 A1* | 9/2010 | Panigrahy et al. | 714/19 |
| 2012/0304244 A1* | 11/2012 | Xie et al. | 726/1 |

OTHER PUBLICATIONS

File format—Wikipedia, the free encyclopedia, 9 sheets [retrieved on Apr. 16, 2012], retrieved from the internet: http://en.wikipedia.org/wiki/File_format.
List of the formats—Wikipedia, the free encyclopedia, 32 sheets [retrieved on Apr. 16, 2012], retrieved from the internet: http://en.wikipedia.org/wiki/List_of_file_formats.

* cited by examiner

*Primary Examiner* — Eleni Shiferaw
*Assistant Examiner* — Gregory M Elmore
(74) *Attorney, Agent, or Firm* — Okamoto & Benedicto LLP (57) ABSTRACT

Incoming files are examined to detect abnormal files. The incoming files may be examined for a weak file structure, such as a weak file format structure or a weak file data structure, to detect abnormal files. A weak file structure includes file structures that do not conform to the file format of the file yet still loadable by a file loader of the file format. The incoming files may also be examined for suspicious loading in memory to detect abnormal files.

16 Claims, 7 Drawing Sheets

METHODS AND APPARATUS FOR DETECTING ABNORMAL COMPUTER FILES

CROSS-REFERENCE TO RELATED APPLICATION

This application claims the benefit of U.S. Provisional Application No. 61/650,094, filed on May 22, 2012, which is incorporated herein by reference in its entirety.

BACKGROUND OF THE INVENTION

1. Field of the Invention

The present invention relates generally to computer security, and more particularly but not exclusively to methods and apparatus for detecting abnormal computer files.

2. Description of the Background Art

Computer viruses, worms, Trojans, rootkits, and spyware are examples of malicious codes that have plagued computer systems throughout the world. Although there are technical differences between each type of malicious code, technology for detecting malicious code is also generally referred to as "antivirus." Malicious codes have become so prevalent that experienced computer users have some form of antivirus in their computers. Antivirus for scanning data for malicious codes is commercially available from several computer security vendors, including TREND MICRO, INC.

Malicious codes may be embedded in files, referred to herein as "malicious files." An antivirus needs a signature or other information for detecting a malicious file. Creating a signature for malicious code takes time and requires an exact sample of the particular malicious code. Unknown malicious codes, i.e., those that are yet to be detected by antivirus researchers and/or have no corresponding signature, are thus not readily detectable by an antivirus. Furthermore, creating a complete set of signatures is getting more difficult with the increasing varieties of malicious files.

SUMMARY

In one embodiment, incoming files are examined to detect abnormal files. The incoming files may be examined for a weak file structure, such as a weak file format structure or a weak file data structure, to detect abnormal files. A weak file structure includes file structures that do not conform to the file format of the file yet still loadable by a file loader of the file format. The incoming files may also be examined for suspicious loading in memory to detect abnormal files.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
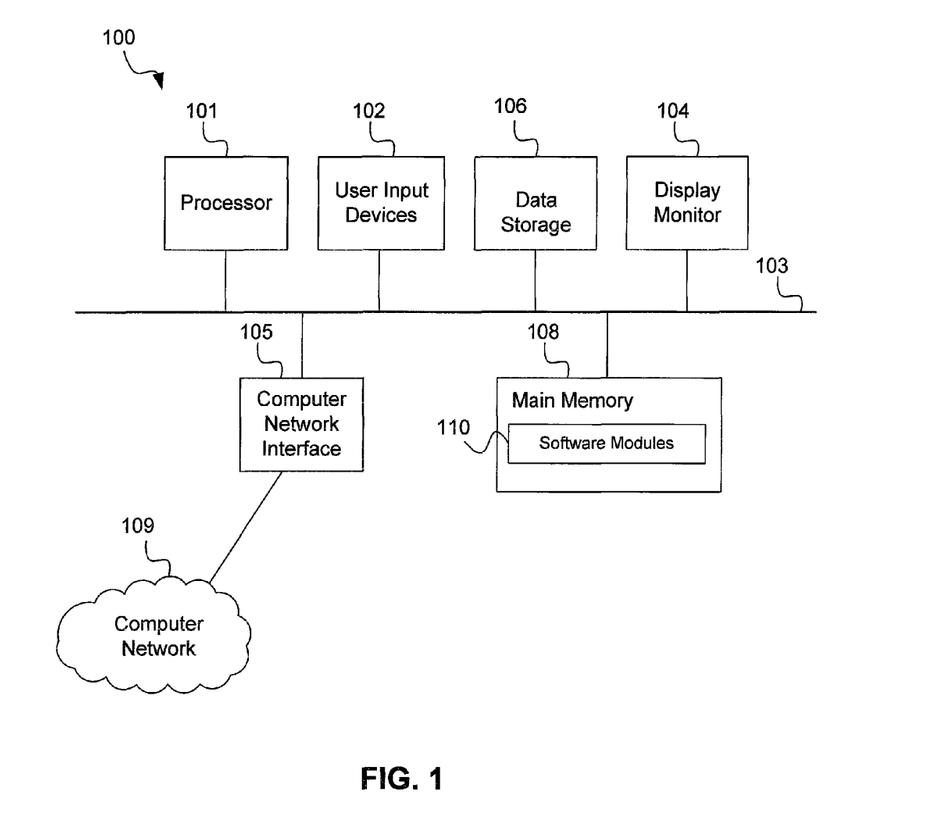
FIG. 1 shows a schematic diagram of a computer that may be employed with embodiments of the present invention.

FIG. 1 shows a schematic diagram of a computer 100 that may be employed with embodiments of the present invention. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise an abnormal file detector 702 (see FIG. 7) and detection rules 703 for determining whether or not a file 701 is abnormal. The file 701 may be stored in the data storage device 106.

The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices.

Computer files are available in various file formats, such as the portable document format (PDF), portable executable (PE) format, and zip file format, to name some examples. Generally speaking, a file format is a particular way that data is encoded for storage in a computer file. Files of a file format are expected to have a file format structure and a file data structure, which are collectively referred to as "file structure," that follow the file format's specification. The file format specification may define the fields of the file format structure, the contents of the fields, the size of the fields, and structures or type of data that may be included in the file, for example. In general, a file loader for the file format understands and loads for execution only those files having a file structure, i.e., a file format structure and a file data structure, that conforms to the specification of the file format. Accordingly, reputable, i.e., legitimate, file producers follow file format specifications.

Sometimes, a file structure may not be completely defined or strongly enforced by its corresponding file format specification. Such file structures are also referred to as "weak file structures." A file with a weak file structure (e.g., weak file data structure, weak file format structure, or both) does not follow the specification of the file format but may remain loadable by the file loader. The inventor believes that weak file structures are problematic in that they may lead to unpredictable operations that may be exploited by malicious code writers.

Figure 2:
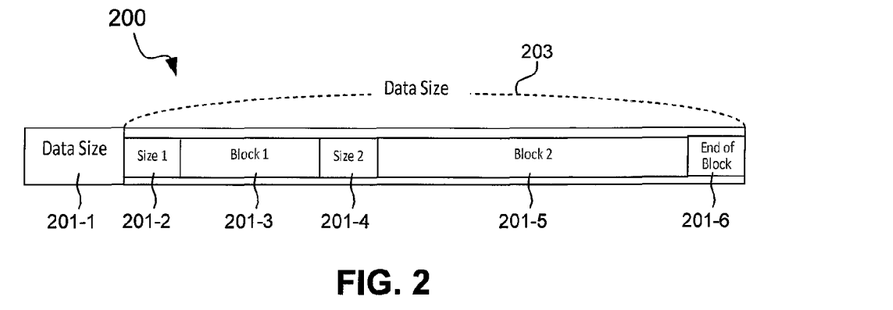
FIGS. 2-4 schematically illustrate a method of identifying a weak file structure in accordance with an embodiment of the present invention.
Figure 3:
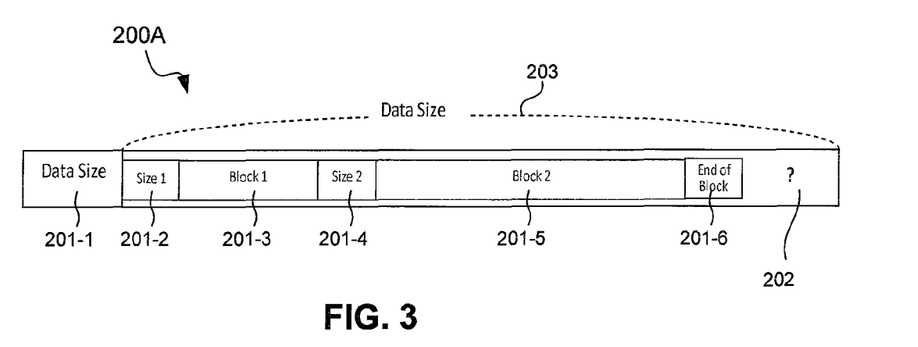
Figure 4:
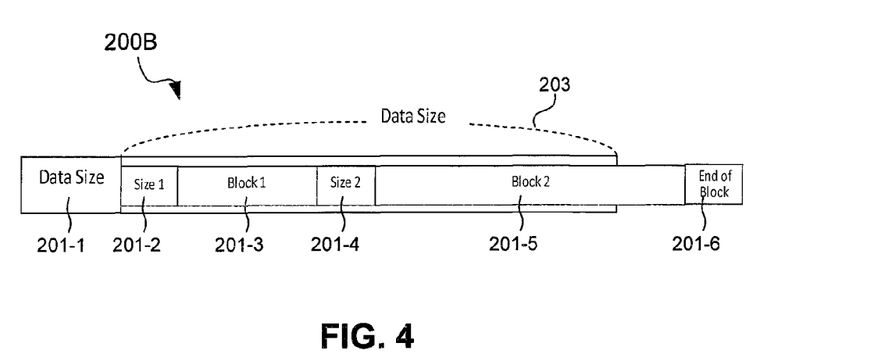

FIGS. 2-4 schematically illustrate a method of identifying a weak file structure in accordance with an embodiment of the present invention. FIGS. 2-4 show file structures for the same file format.

Beginning with FIG. 2, there is schematically shown a conforming file structure 200 as defined by a file format specification. The file structure 200 is a "conforming file structure" in that it has a format and data that conform to the file format specification. A conforming file structure can be loaded by a file loader for the file format. The file format specification defines a conforming file structure to comprise fields 201 (i.e., 201-1, 201-2, 201-3, 201-4, 201-5, 201-6). A field 201 may be a data unit, section, or other portion of a file structure. In the example of FIG. 2, a data size field 201-1 indicates the defined data size 203 of the data included in the file structure. The end of block field 201-6 indicates the end of the file structure 200. Because the file format does not expect any data beyond the end of block field 201-6, the useable size of a conforming file structure 200 as defined in the file format specification is thus the size of the data in the fields 201-2 to 201-6.

FIG. 3 schematically shows a nonconforming file structure 200A for the same file format as the file structure 200. The nonconforming file structure 200A is so named because it does not follow the file format specification, and may thus employ the fields 201 in a manner not defined in or contrary to the file format specification. In the example of FIG. 3, the nonconforming file structure 200A includes a portion 202 that extends beyond the end of block 201-6, which the file format specification defines as indicating the end of the file format structure. That is, the nonconforming file structure 200A does not follow the file format structure dictated by the file format specification. This results in the defined data size 203 to be larger than the used data size expected under the file format specification, i.e., the total size of the data from the field 201-2 to the field 201-6. The larger defined data size 203 allows for additional program code, which may be malicious, to be included in the portion 202. However, even though the nonconforming file structure 200A does not conform to the file format specification, the file loader for the file format still loads the nonconforming file structure 200A into memory for execution by the processor. This indicates that the nonconforming file structure 200A of FIG. 3 is a weak file structure.

FIG. 4 schematically shows a nonconforming file structure 200B for the same file format as the file structure 200 of FIG. 2. The nonconforming file structure 200B does not follow the file format specification in that the defined data size 203 is less than the used data size expected under the file format specification. In the example of FIG. 4, the defined data size 203 does not take into account data up to the end of block field 201-6. This time, however, the file loader for the file format does not load a file with the nonconforming file structure 200B. In particular, the file loader generates an error message when trying to load the nonconforming file structure 200B for execution.

From the example of FIGS. 2-4, a detection rule for detecting an abnormal file may be defined as follows:
  if (Defined Data Size>Used Data Size), the file is an abnormal file;
  if (Defined Data Size<Used Data Size), the file is a damaged file;
  if (Defined Data Size=Used Data Size), the file is a normal file;

where "Defined Data Size" refers to the size of the file format structure as defined in the field 201-1 and "Used Data Size" refers to the size of fields 201-2 to 201-6. That is, a file having a file format structure with a defined data size greater than the used data size is an abnormal file. An abnormal file is not damaged in that it is loadable by the file loader. However, an abnormal file is not normal in that it does not conform to the file format specification and yet still loadable by the file loader for execution. In one embodiment, an abnormal file is a file with a weak file structure. An abnormal file is highly suspicious in that a malicious code writer may exploit the weak file structure to insert malicious code into the file.

A damaged file is a file that is not loadable by the file loader. A damaged file is relatively harmless because it cannot be executed. However, it is advantageous to alert the user when a damaged file is detected. This gives the user the chance to fix or replace the damaged file before the user needs to use the file. A file that is neither abnormal nor damaged may be deemed as a normal file.

As another example, Table 1 shows an object of a nonconforming file structure of an example PDF file, while Table 2 shows an object of a conforming file structure of another example PDF file.

TABLE 1

1 0 obj
<<
/#50#61g#65s 2 0 R
/#54#79#70e /#43at#61#6c#6f#67
/#4f#70#65#6eAct#69o#6e 11 0 R
/A#63r#6fF#6fr#6d 13 0 R
>>
endobj

TABLE 2

1 0 obj
<<
/Pages 2 0 R
/Type /Catalog
/OpenAction 11 0 R
/AcroForm 13 0 R
>>
endobj The object shown in Table 2 follows the PDF specification. It is thus not surprising that the object of Table 2 can be loaded by a PDF file loader for execution. In contrast, the object of Table 1 includes data structure not explicitly defined in the PDF specification. In particular, the fields for "PAGES" "TYPE", etc. have been replaced with some code or encrypted data, which are not recognized in the PDF specification. Surprisingly, however, the object of Table 1 is still loadable by the PDF file loader for execution. This indicates that a file containing the object of Table 1 has a weak file structure and is thus an abnormal file. A malicious code writer may take advantage of this situation by inserting malicious code in the weak file structure.

In light of the foregoing, it can be appreciated that a weak file structure of a file format may be identified by making a file structure nonconforming, i.e., not follow the file format specification, and then checking whether a file with the nonconforming file structure is still loadable by the file loader for the file format. If so, the nonconforming file structure is a weak file structure. A file structure may be made nonconforming by formatting the file structure or including data in the file structure (as in Table 1) in a way not defined or recognized by the file format specification. Once a weak file structure is identified, a rule for detecting an abnormal file may be created by looking for the difference between the weak file structure and a conforming file structure. The rule may then be incorporated in the detection rules 703 (see FIG. 7) and employed by the abnormal file detector 702 to detect potentially dangerous abnormal files.

Figure 5:
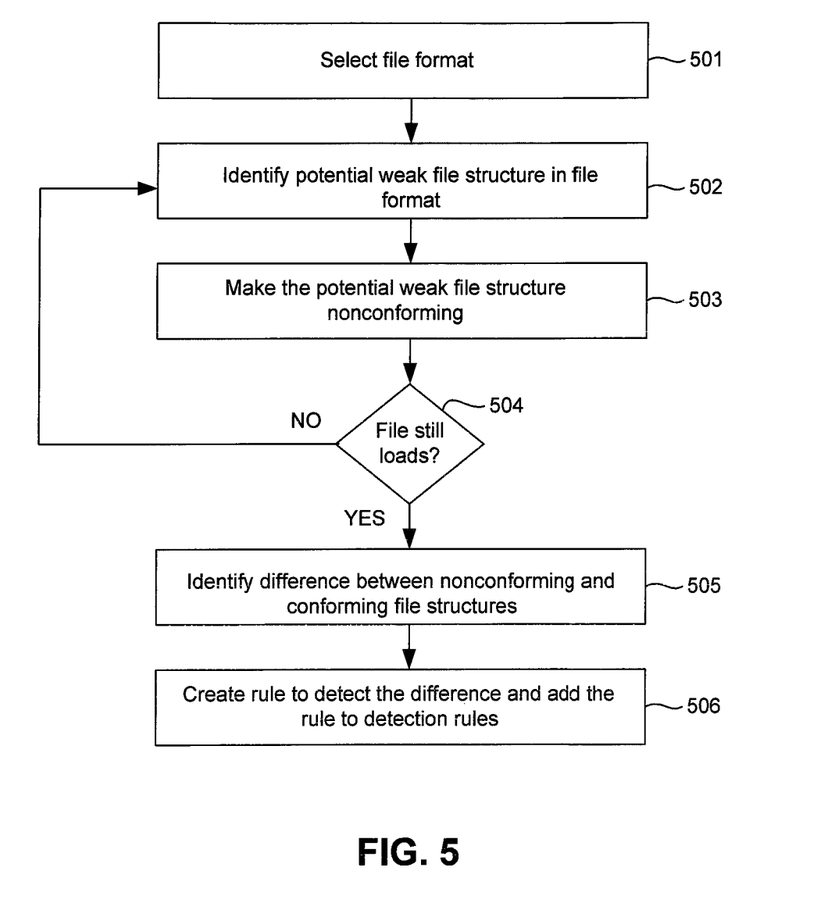
FIG. 5 shows a flow diagram of a method of identifying weak file structures in accordance with an embodiment of the present invention.

FIG. 5 shows a flow diagram of a method of identifying weak file structures in accordance with an embodiment of the present invention. In the example of FIG. 5, a file format is selected for investigation (step 501). A potential weak file structure of the file format is identified (step 502). The potential weak file structure may simply be a file structure of the file format that is selected for testing. The potential weak file structure may also be a file structure of the file format that is known to be exploited by malicious code writers. The potential weak file structure is made nonconforming to the file format specification (step 503). For example, a field of the potential weak file structure may be employed and exercised in a manner prohibited or not defined by the file format specification. The now nonconforming potential weak file structure is included in a test file. A file loader for the file format specification is then used to load the test file for execution (step 504). If the test file fails to load, the potential weak file structure is not a weak file structure. In that case, another potential weak file structure of the file format is identified (step 504 to step 502).

If the test file still loads even with the nonconforming potential weak file structure, the potential weak file structure is a weak file structure. In that case, the difference between the nonconforming weak file structure and a conforming file structure is identified (step 505). A rule is created for detecting the difference, and the rule is added to detection rules for identifying abnormal files (step 506). Different detection rules may be created for different file formats.

Instead of looking for weak file structures, an abnormal file may also be detected based on how it is loaded in memory. FIGS. 6A-6E schematically illustrate detection of abnormal files in accordance with an embodiment of the present invention. In the example of FIGS. 6A-6E, a file includes sections for raw data 602 and raw data 604. Raw data 602 and 604 may comprise user data, which are original data in the storage device that has not been processed or manipulated The file is loaded by a file format loader into virtual memory. In the example of FIGS. 6A-6E, each block of the virtual memory as illustrated is a 4 Kbyte page.

Figure 6A:
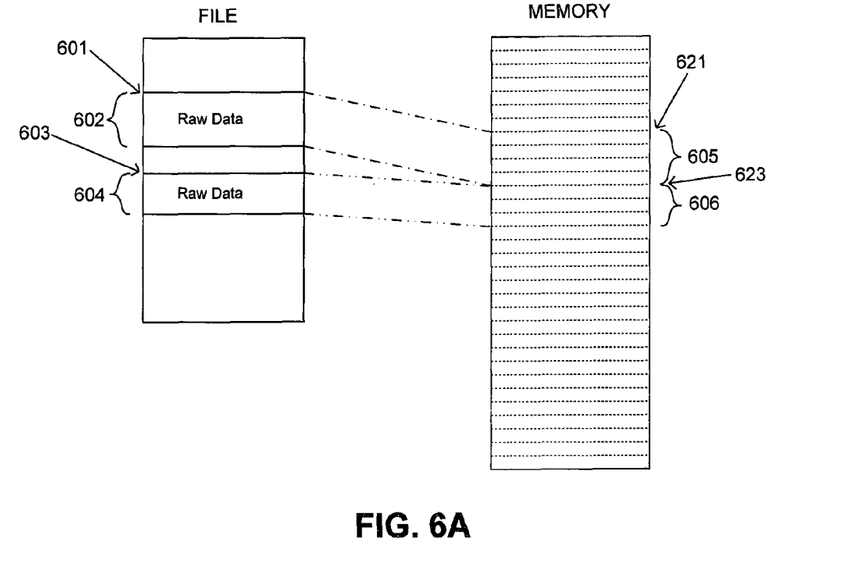
FIGS. 6A-6E schematically illustrate detection of abnormal files in accordance with an embodiment of the present invention.

FIG. 6A schematically illustrates how a normal file having the raw data 602 and 604 is loaded by the file format loader from a storage device into virtual memory. In the example of FIG. 6A, the file includes the raw data 602 at an entry point 601 in the file, and the raw data 604 at an entry point 603 in the file. As loaded in memory, the raw data 602 has a virtual address entry point 621 and the raw data 604 has a virtual address entry point 623 in the memory. A normal file that conforms to a file format may have raw data sections that have virtual address entry point that start at the beginning of a page of memory, may have allocated size in memory that is equal to or larger than the size of the raw data, may be loaded in memory in the order they appear in the file, and may be in consecutive locations in the memory if they are consecutive in the file. A file may thus be examined for abnormality by comparing how the file is stored as a file in a data storage device to how the file is loaded in memory for execution.

Figure 6B:
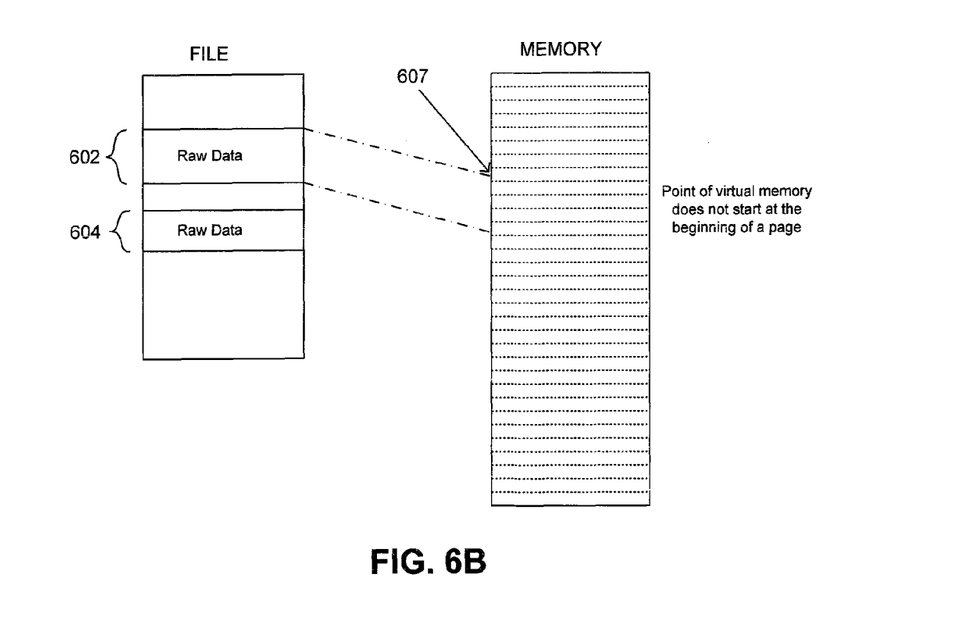

FIG. 6B schematically illustrates an example when the file is deemed abnormal based on how the file is loaded in memory. In the example of FIG. 6B, the raw data 602 is loaded such that it has a virtual memory address entry point 607 that does not start at the beginning of a page of memory. In the example of FIG. 6B, the entry point 607 starts in the middle of a 4 Kbyte page of memory. The inventor believes that this is a suspicious situation, as legitimate file vendors typically provide files that are loaded such that their raw data sections are loaded in memory at the start of a page of memory.

Figure 6C:
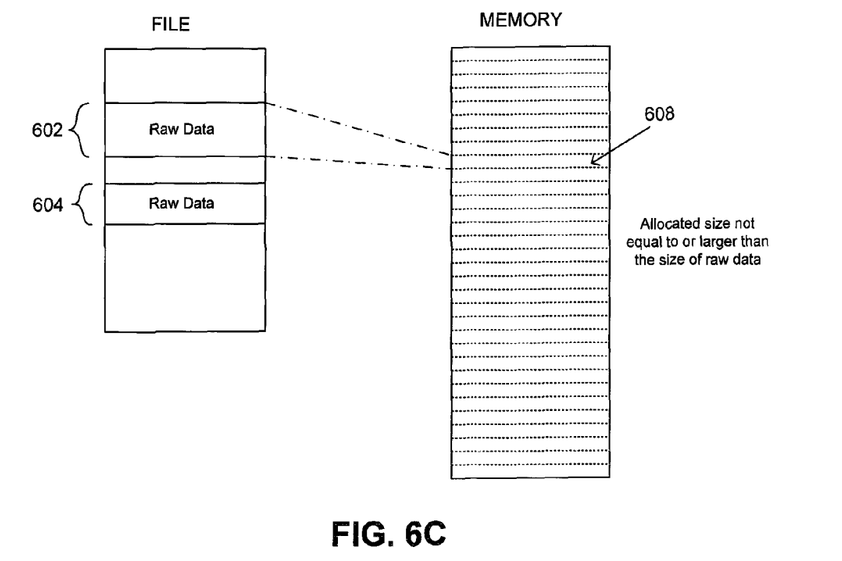

FIG. 6C schematically illustrates another example when the file is deemed abnormal based on how the file is loaded in memory. In the example of FIG. 6C, the raw data 602 has an allocated memory 608 in memory that is smaller than the size of the raw data 602 in the file. The inventor believes that this is a suspicious situation, as normal files have raw data that are allocated a size in memory that is equal to or larger than the size of the raw data in the file.

Figure 6D:
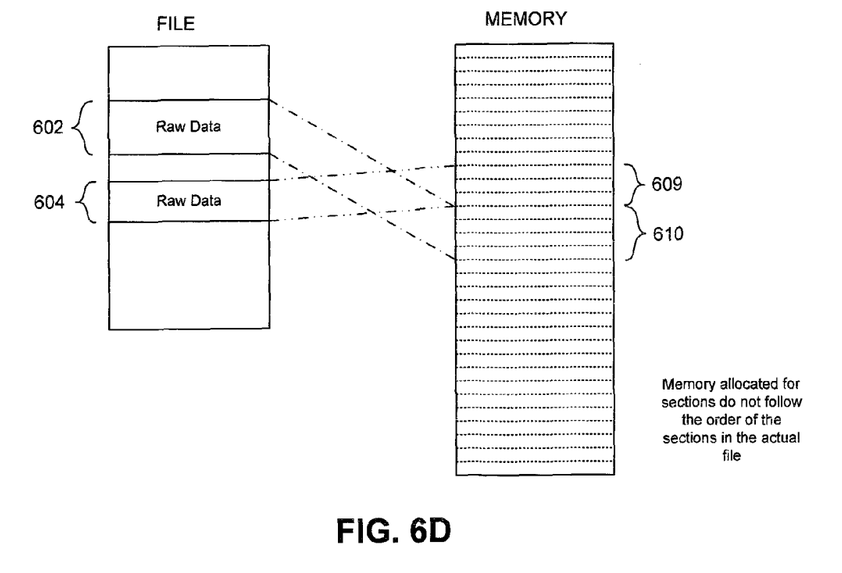

FIG. 6D schematically illustrates another example when the file is deemed abnormal based on how the file is loaded in memory. In the example of FIG. 6D, the section for raw data 602 is located before the section for raw data 604 in the file. However, as loaded in memory, the allocated memory 609 for the raw data 604 is before the allocated memory 610 for the raw data 602. The inventor believes that this is a suspicious situation because raw data sections typically appear in the same order in the file and memory.

Figure 6E:
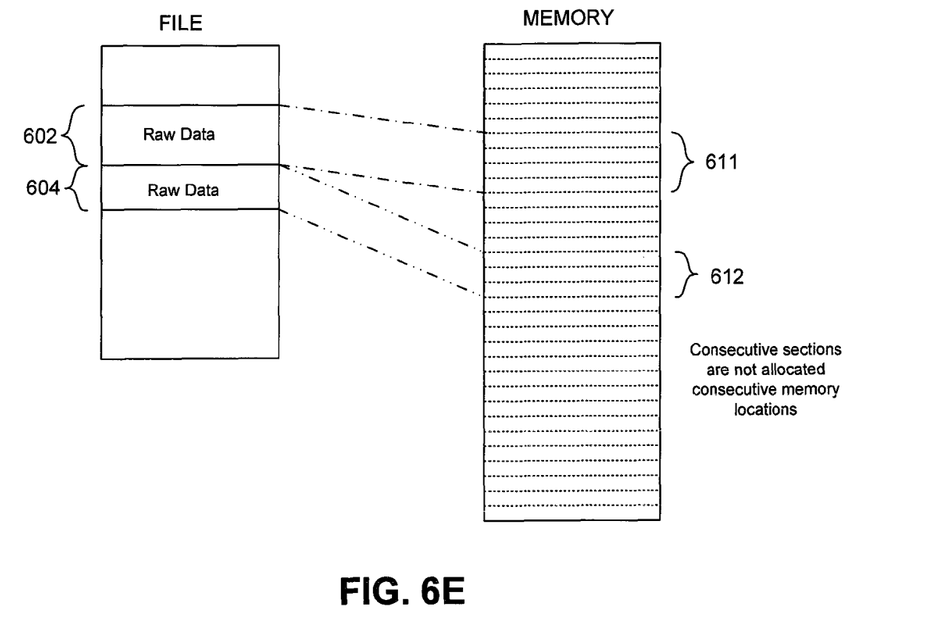

FIG. 6E schematically illustrates another example when the file is deemed abnormal based on how the file is loaded in memory. In the example of FIG. 6E, the allocated memory 611 for the raw data 602 and the allocated memory 612 for the raw data 612 are not consecutive in the memory although they are consecutive in the file; there is a gap between the allocated memory 611 and allocated memory 612. The inventor believes that this is a suspicious situation because consecutive raw data sections in the file typically appear consecutively and in the same order in the memory.

Figure 7:
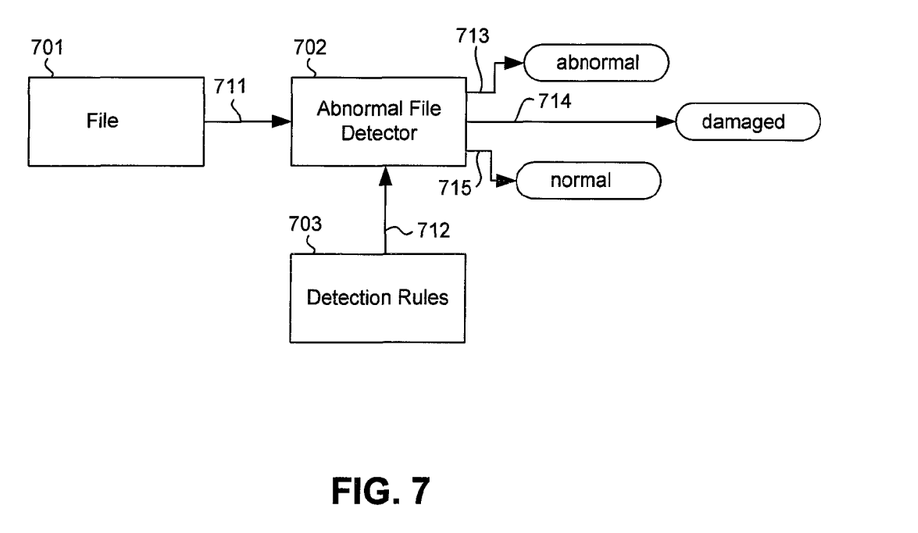
FIG. 7 schematically illustrates detection of an abnormal file in accordance with an embodiment of the present invention.

Rules for detecting an abnormal file based on how the file is loaded in memory may be stored as detection rules (e.g., detection rules 703 of FIG. 7).

FIG. 7 schematically illustrates detection of an abnormal file in accordance with an embodiment of the present invention. In the example of FIG. 7, an abnormal file detector 702 may comprise computer-readable program code for detecting an abnormal file. In one embodiment, the abnormal file detector 702 is configured to receive an incoming file 701 (arrow 711) and examine the file 701 for a weak file structure, i.e., a file structure that does not conform to the file format specification yet still loadable by the file loader for execution. The abnormal file detector 702 may also be configured to take into account how the file 701 is loaded in memory to determine whether or not the file 701 is an abnormal file. Rules for detecting weak file structures and suspicious loading of files into memory may be found in the detection rules 703. In one embodiment, the abnormal file detector 702 checks the detection rules 703 to determine whether a file is abnormal (arrow 712). The detection rules 703 may also include rules for detecting damaged files.

If the file 701 has a weak file structure yet still loadable in memory or is loaded in memory in a suspicious way (e.g., as in FIGS. 6B-6E), the abnormal file detector 702 deems the file 701 as an abnormal file (arrow 713). If a file structure of the file 701 does not conform to the file format and renders the file 701 unloadable by the file loader, the abnormal file detector 702 deems the file 701 as a damaged file (arrow 714). Otherwise, the abnormal file detector 702 deems the file 701 as a normal file (arrow 715). The abnormal file detector 702 may consult the detection rules 703 to determine whether the file 601 is abnormal, damaged, or normal.

The abnormal file detector 702 may perform an action in response to detecting an abnormal or damaged file. For example, in response to detecting an abnormal file, the abnormal file detector 702 may alert the user of the computer where the abnormal file detector 702 is running, prevent the abnormal file from being loaded by the file loader, or both. In response to detecting a damaged file, the abnormal file detector 702 may be configured to display a warning message to the user.

Embodiments of the present invention provide benefits heretofore unrealized. Because embodiments of the present invention detect vulnerable features rather than actual malicious codes, the embodiments may be used to guard against current and yet to be created malicious codes that may exploit the vulnerabilities. Furthermore, embodiments of the present invention may be implemented and employed without necessarily needing malicious code samples or malicious code signatures.

Methods and apparatus for detecting abnormal files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying an abnormal computer file, the method comprising:
    a computer receiving an incoming file of a particular file format;
    the computer reading the incoming file;
    the computer deeming the incoming file an abnormal file when the incoming file has a file format structure that does not conform to a specification of the particular file format but the incoming file is still loadable for execution by a loader of the particular file format;
    the computer not deeming the incoming file as an abnormal file when the incoming file has raw data sections that have virtual address entry points that start at a beginning of a page of memory, have an allocated size in memory that is equal to or larger than a size of the raw data sections, are loaded in memory in an order the raw data sections appear in the incoming file, and are in consecutive locations in memory when the raw data sections are consecutive in the incoming file; and
    the computer preventing the incoming file from being loaded by the loader of the particular file format when the incoming file is an abnormal file.

2. A method of identifying an abnormal computer file, the method comprising:
    a computer receiving a file of a particular file format;
    the computer opening the file;
    deeming the file to be an abnormal file when the file has a nonconforming file structure that does not conform to a specification of the particular file format but still loadable for execution by a file loader of the particular file format; and
    not deeming the file to be an abnormal file when the file has raw data sections that have virtual address entry points that start at a beginning of a page of memory, have an allocated size in memory that is equal to or larger than a size of the raw data sections, are loaded in memory in an order the raw data sections appear in the file, and are in consecutive locations in memory when the raw data sections are consecutive in the file.

3. The method of claim 2 further comprising:
    deeming the file to be a damaged file when the file has the nonconforming file structure that does not conform to the specification of the particular file format and is not loadable for execution by the file loader of the particular file format.

4. The method of claim 3 further comprising:
    deeming the file to be a normal file when the file is not a damaged file and not an abnormal file.

5. The method of claim 2 wherein the particular file format is a portable document format (PDF).

6. The method of claim 2 further comprising consulting detection rules.

7. A computer comprising a memory and a processor configured to execute computer-readable program code in the memory, the memory comprising:
    an abnormal file detector receiving a file of a particular file format, deeming the file to be an abnormal file when the file has a nonconforming file structure that does not conform to a specification of the particular file format but still loadable for execution by a file loader for the particular file format, and not deeming the file to be an abnormal file when the file has raw data sections that have virtual address entry points that start at a beginning of a page of memory, have an allocated size in memory that is equal to or larger than a size of the raw data sections, are loaded in memory in an order the raw data sections appear in the file, and are in consecutive locations in memory when the raw data sections are consecutive in the file.

8. The computer of claim 7 wherein the abnormal file detector deems the file to be a damaged file when the file has the nonconforming file structure that does not conform to the specification of the particular file format and is not loadable for execution by the file loader for the particular file format.

9. The computer of claim 7 wherein the memory further comprises:
    detection rules for detecting an abnormal file.

10. The computer of claim 7 wherein the particular file format comprises a portable document format (PDF).

11. A method of identifying an abnormal computer file, the method comprising:
    generating a nonconforming file structure by using a field of a conforming file structure such that the conforming file structure no longer conforms to a specification of a file format;
    loading a test file with the nonconforming file structure for execution by a processor using a file loader of the file format;
    determining whether or not the test file with the nonconforming file structure is loadable by the file loader for execution by the processor;
    deeming the file to be an abnormal file when the test file is loadable by the file loader for execution by the processor and has a nonconforming file structure;
    not deeming the file to be an abnormal file when the file has raw data sections that have virtual address entry points that start at the beginning of a page of memory, have an allocated size in memory that is equal to or larger than a size of the raw data sections, are loaded in memory in an order the raw data sections appear in the file, and are in consecutive locations in memory when the raw data sections are consecutive in the file;
    identifying a difference between the nonconforming file structure and the conforming file structure to generate a detection rule when the test file is deemed to be an abnormal file.

12. The method of claim 11 further comprising:
    receiving an incoming file;

consulting the detection rule to detect that the incoming file has a nonconforming file structure that does not conform to the specification of the file format; and in response to detecting the incoming file has a nonconforming file structure, deeming the incoming file as an abnormal file.

13. The method of claim 11 wherein the file format comprises a portable document format (PDF).

14. The method of claim 12 wherein in response to deeming the incoming file as an abnormal file, preventing the incoming file from being loaded for execution.

15. The method of claim 12 wherein in response to deeming the incoming file as an abnormal file, alerting a user.

16. The method of claim 11 wherein generating the nonconforming file structure by using the field of the conforming file structure so that the conforming file structure no longer conforms to the specification of the file format comprises indicating a data size in the field, the data size including data beyond an end of block field of the file structure of the file.

* * * * *

UNITED STATES PATENT AND TRADEMARK OFFICE
CERTIFICATE OF CORRECTION

PATENT NO. : 8,925,074 B1  Page 1 of 1
APPLICATION NO. : 13/550869
DATED : December 30, 2014
INVENTOR(S) : Chih-Kun Ho It is certified that error appears in the above-identified patent and that said Letters Patent is hereby corrected as shown below:

Title Page item (75) Inventor: replace "Chik-Kun Ho" with

-- Chih-Kun Ho --

Signed and Sealed this
Seventh Day of June, 2016

Michelle K. Lee
*Director of the United States Patent and Trademark Office*